United States Patent [19]

Zosi

[11] Patent Number: 4,600,207
[45] Date of Patent: Jul. 15, 1986

[54] CONNECTION OF STEERING COLUMN TO FRAME

[75] Inventor: Michael Zosi, Rennaz, Switzerland

[73] Assignee: Bernd Grohe, Les Cretes, Switzerland

[21] Appl. No.: 757,161

[22] Filed: Jul. 22, 1985

Related U.S. Application Data

[63] Continuation-in-part of Ser. No. 533,295, Sep. 19, 1983, abandoned.

[30] Foreign Application Priority Data

Sep. 27, 1982 [CH] Switzerland .................. 5674/82

[51] Int. Cl.⁴ .................................................. B62K 3/02
[52] U.S. Cl. ...................................... 280/279; 74/493; 280/276; 403/85; 403/91
[58] Field of Search ............... 280/279, 276, 275, 277, 280/281 R, 281 LP; 180/219, 227; 188/196 M, 196 V; 403/85, 92, 91; 74/493

[56] References Cited

U.S. PATENT DOCUMENTS 3,866,946  2/1975  Robison ..................... 384/255 X
4,147,371  4/1979  Morita et al. .................. 180/219 X
4,162,797  7/1979  McBride ..................... 280/275

FOREIGN PATENT DOCUMENTS 56956   11/1939  Denmark ........................... 280/276
439342  9/1948   Italy ................................... 280/276
455544  7/1968   Switzerland ..................... 280/276
562010  6/1944   United Kingdom ............ 280/276
570439  7/1945   United Kingdom ............ 280/279

Primary Examiner—John J. Love
Assistant Examiner—Mitchell J. Hill
Attorney, Agent, or Firm—James E. Nilles

[57] ABSTRACT

For adjusting the angle of inclination of a motorcycle steering column relative to the frame of the motorcycle the tubular steering column support has, near one of its ends, a pivot connection with the frame whereby its other end is swingable forward and rearward relative to the frame. Near the other end of the steering column support is an eccentric connection between it and the frame. Adjustment of the eccentric is effected by means of a swingable arm projecting rearward from one element of the eccentric and a lead screw actuator connected between that arm and the frame. Adjustment can be made while riding, to accommodate riding speed and conditions.

4 Claims, 7 Drawing Figures

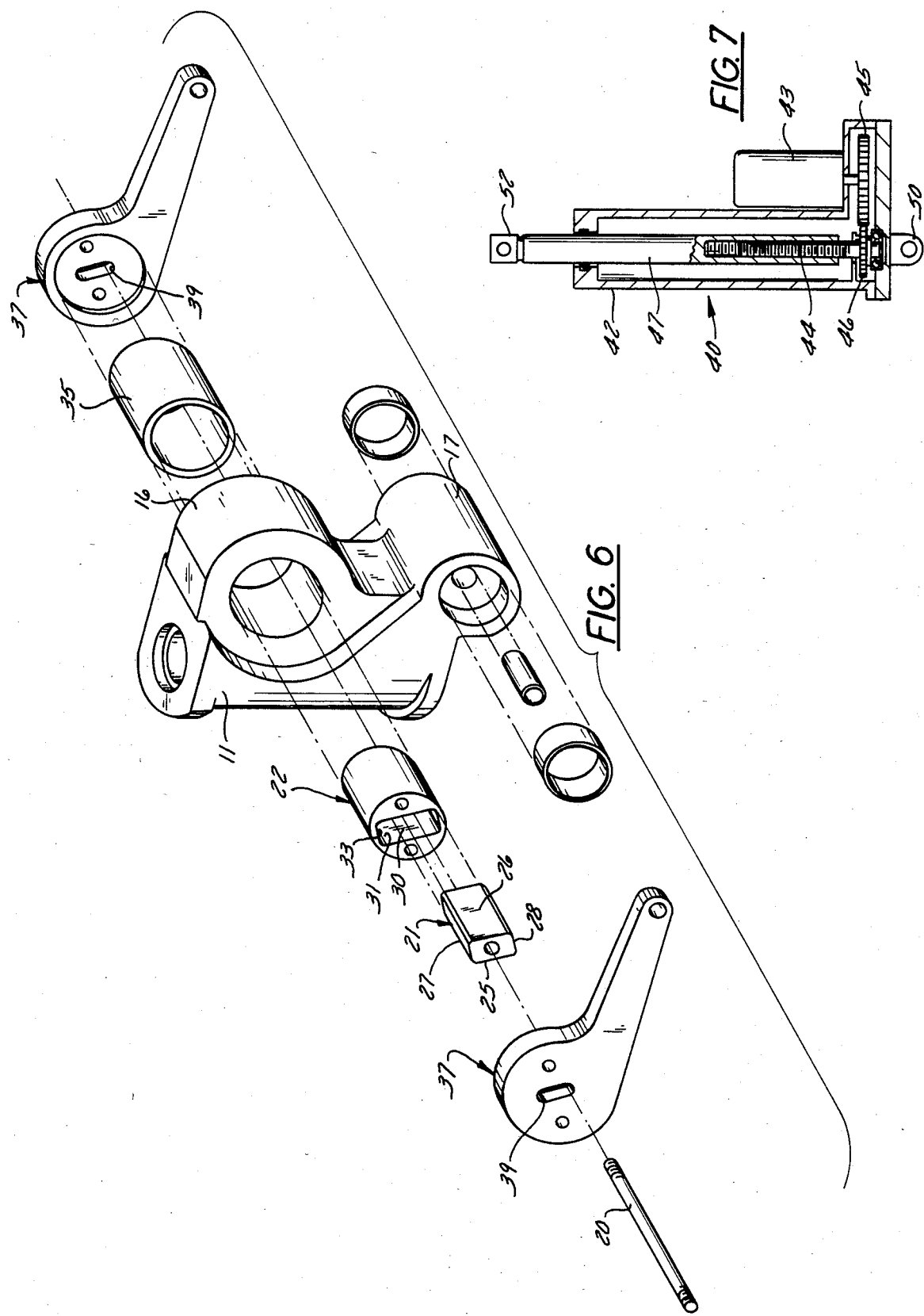

CONNECTION OF STEERING COLUMN TO FRAME

This application is a continuation-in-part of Ser. No. 533,295, filed Sept. 19, 1983 now abandoned.

FIELD OF THE INVENTION

This invention relates to a connection between the steering column and the frame of a motorcycle whereby the angle of inclination of the steering column to the vertical is adjustable; and the invention is more particularly concerned with a connection of that type that is adjustable while the motorcycle is in motion.

BACKGROUND OF THE INVENTION

It is known that the handling of a motorcycle becomes heavy at low speeds if the steering column is too much inclined to the vertical (i.e., too nearly horizontal), whereas if the steering column is more nearly vertical the motorcycle handles well in low speed riding but handles poorly in fast riding because torques develop at high speeds that must be resisted or overcome by the driver.

U.S. Pat. No. 3,866,946 discloses an arrangement whereby a motorcycle can be adapted for desired speed conditions with the use of interchangeable parts, so that it is suitable either for slow riding, or for moto-cross riding or the like, or is especially adapted for fast riding such as occurs in motorcycle racing. To convert the motorcycle from suitability for one type of riding to another it must be partially disassembled. Therefore this arrangement has the disadvantage of being an either/or solution or a compromise solution which does not offer the possibility of adapting the motorcycle immediately to existing conditions, preferably even while it is being operated.

British Pat. No. 570,439 discloses a motorcycle with a steering column that is adjustable as to its angle of inclination, wherein the front fork is spaced to the front of a steering stem which is rotatable in the frame. The front fork is connected with that stem by means of upper and lower bracket plates which extend forward from upper and lower end portions of the stem. The fork has a pivotal connection to the lower bracket plate, and the upper bracket plate is confined to limited forward and rearward adjusting motion relative to the stem, having a forwardly and rearwardly elongated slot through which the upper end portion of the stem extends. The upper end portion of the stem is threaded, and nuts on it clampingly engage the upper bracket plate to hold the fork in any desired position of tilting adjustment relative to the axis of the stem. With this arrangement adjustment of the angle of inclination of the front fork could be accomplished only with the motorcycle at a standstill and with the aid of tools. This solution never found acceptance in practice because it did not allow the motorcycle to be adapted to a change in terrain or to changed riding conditions while it was being driven.

SUMMARY OF THE INVENTION

The object of the present invention is to provide, in a motorcycle, a connection between the frame and the steering column that permits the angle of upward and rearward inclination of the steering column axis to be adjustingly changed, not only when the motorcycle is at a standstill but also while it is in motion, so that the angle of inclination of the steering column can be adjusted immediately and as necessary to suit existing conditions.

Another object of the present invention is to provide a connection between the frame of a motorcycle and its steering column whereby the angle of inclination of the steering column can be quickly and easily adjusted to suit riding conditions, which allows such adjustment to be made either manually by actuation of a switch or automatically by means of a suitable speed sensing device, and which has the further important advantage that the steering column is securely held at any angle of inclination to which it may be adjusted, without reliance upon clamping nuts or the like that might be loosened by vibration.

BRIEF DESCRIPTION OF DRAWINGS

In the accompanying drawings, which illustrate what is now regarded as a preferred embodiment of the invention:

FIG. 6 is a disassembled perspective view of the elements comprising the adjustable connection; and FIG. 7 is a view in vertical section of a form of actuator for adjusting the steering column.

DETAILED DESCRIPTION OF PREFERRED EMBODIMENT OF THE INVENTION

Figure 1:
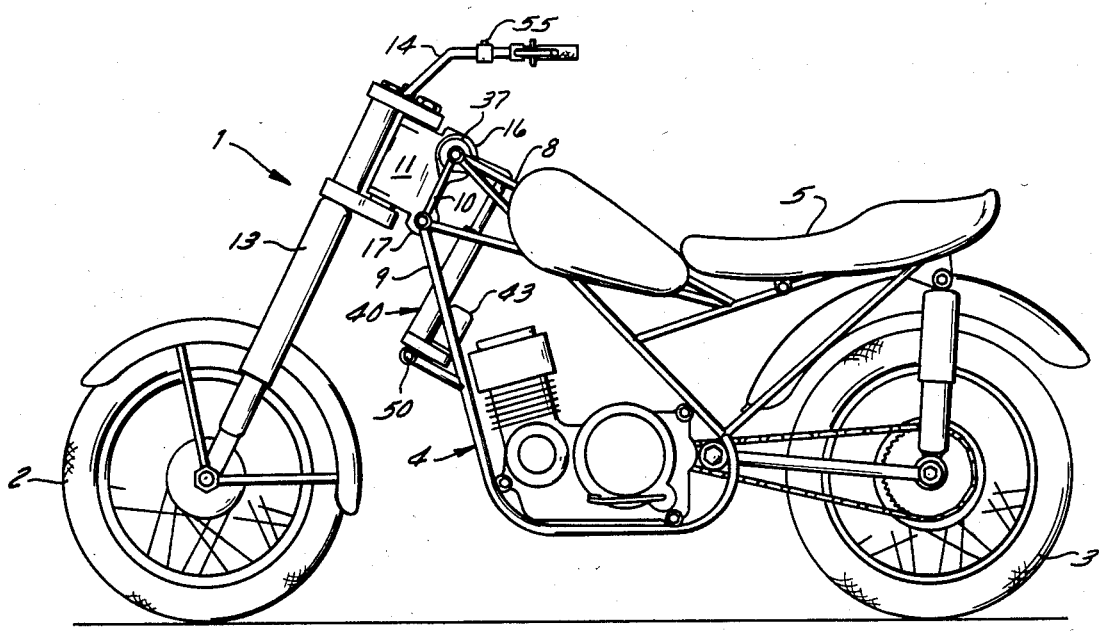
FIG. 1 is a more or less diagrammatic side view of a motorcycle embodying the principles of the present invention.
Figure 2:
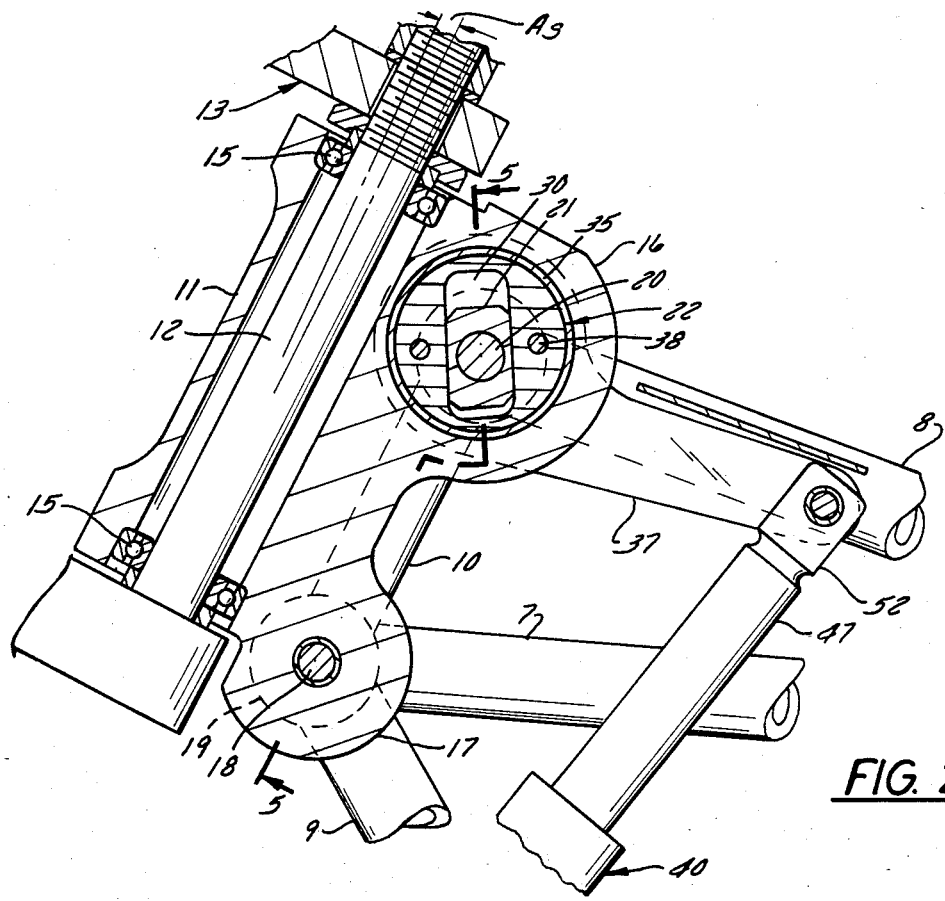
FIG. 2 is a fragmentary view in section, taken substantially on the plane of symmetry of the motorcycle, showing the adjustable connection of this invention in its relationship to the front portion of the motorcycle frame and to the steering column, the latter being shown in a position of adjustment at which it is at or near its maximum inclination to the vertical.
Figure 3:
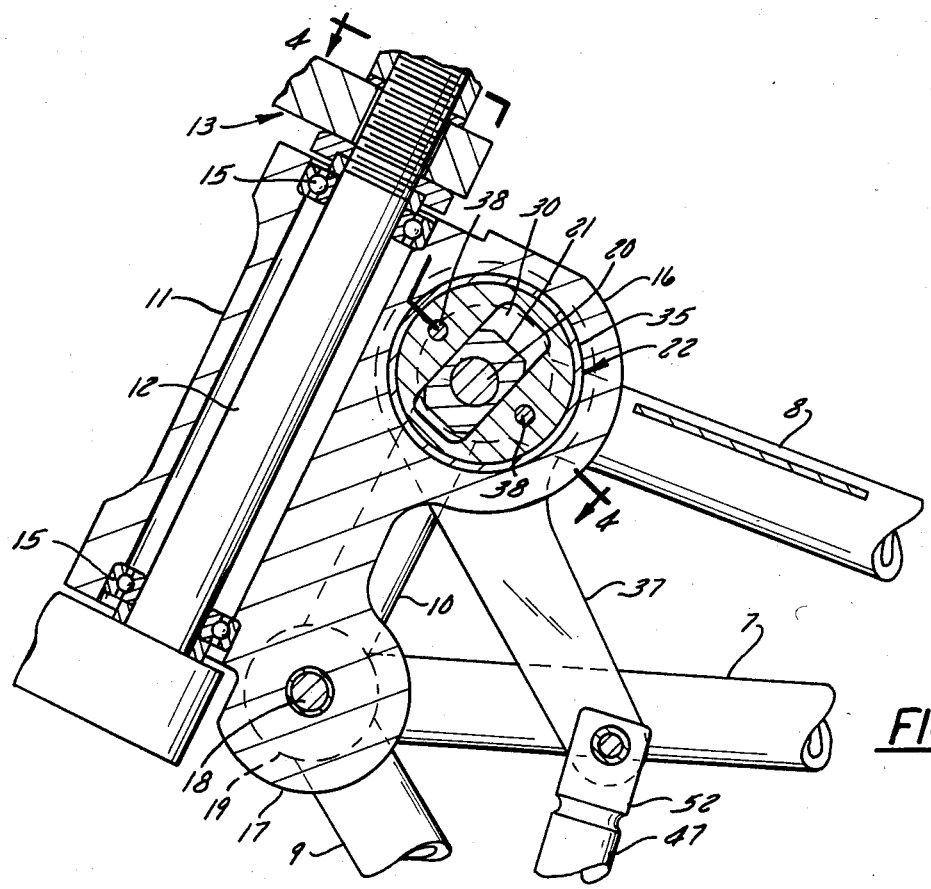
FIG. 3 is a view generally similar to FIG. 2 but showing the steering column in a position of adjustment substantially nearer vertical.
Figure 4:
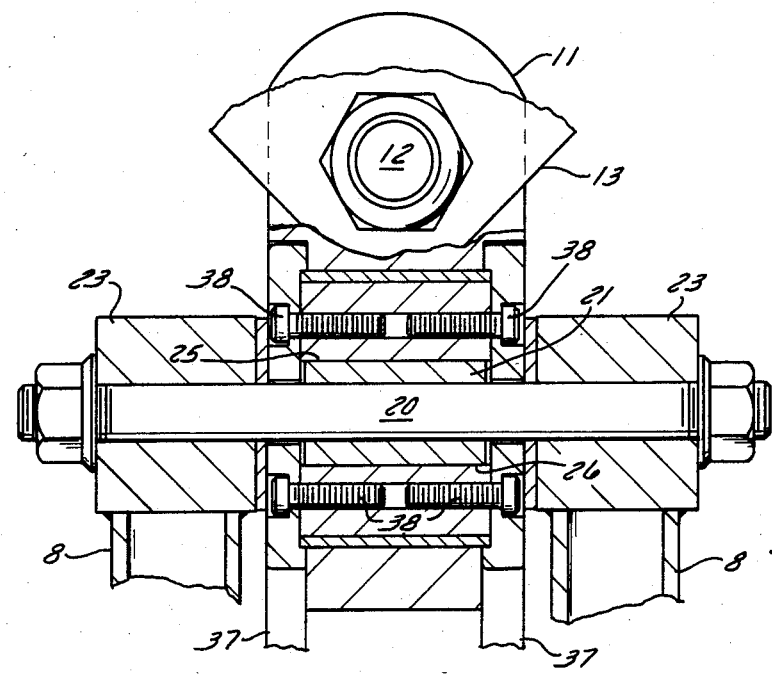
FIG. 4 is a view in section taken on the line 4—4 in FIG. 3.

A motorcycle 1 that embodies the present invention has a front wheel 2 and a rear wheel 3 that are connected by a frame 4 which supports a seat 5 for a rider. The frame 4 is for the most part conventional and is therefore illustrated rather schematically as comprising bars or similar elongated frame members 8, 9 and 10 that are rigidly connected with one another. The rear wheel 3 is mounted for rotation on an axis that maintains a fixed orientation in relation to the frame 4.

At its front the frame 4 is bifurcated to accommodate the adjustable connection of this invention, and thus front portions of the frame are duplicated at opposite sides of a plane of symmetry that is normal to the axis of the rear wheel 3. At each side of that plane is a front frame member 10 which is relatively short and which is connected to the vertically spaced apart front ends of frame members 8 and 9. The front frame members 10 are parallel to one another, and each is preferably lengthwise oriented at a rearward and upward inclination, but more nearly vertical than horizontal.

Connected to the front of the frame 4 to be adjustably swingable relative to it, as described hereinafter, is a tubular steering column support 11 that defines an upwardly and rearwardly inclined steering axis $A_s$ that is contained in the above mentioned plane of symmetry.

Extending coaxially through the steering column support 11 and confined to coaxial swiveling in it is a shaft-like steering column 12. At its lower end, which projects below the bottom end of the steering column support 11, the steering column 12 is connected to a generally conventional front wheel fork assembly 13. The front wheel 2 has its axle secured to the lower ends of the legs of the front fork 13, so as to be confined to rotation relative to that fork and to be steerable by swiveling of the steering column 12 in the steering column support 11. For steering control, the upper end of the steering column 12 is connected with generally conventional handlebars 14.

Apart from the adjustably swingable connection between the steering column support 11 and the frame 5 that is described hereinafter, the steering column support 11 is generally similar to a conventional steering column support that is rigidly fixed to the front of a motorcycle frame; and in like manner the steering column 12 is generally conventional in its relation to the front fork 13, the handlebars 14 and the steering column support 11, in which it can be swivelably supported by means of conventional bearing rings 15.

Figure 5:
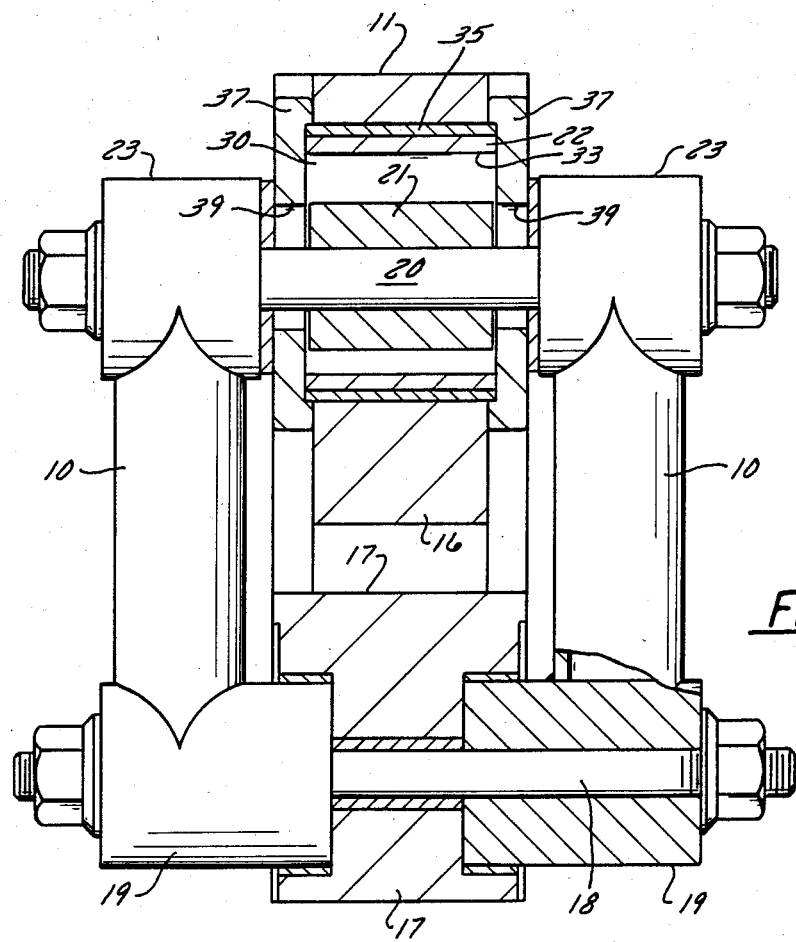
FIG. 5 is a view in section taken on the line 5—5 in FIG. 2.

The above mentioned adjustably swingable connection between the frame 4 and the steering column support 11 provides for varying the upward and rearward inclination of the steering axis $A_s$ through a range of angles—typically about a 10° range—to suit riding conditions. For the purposes of that connection the steering column support 11 has upper and lower rearwardly projecting bosses 16 and 17, respectively near its upper and lower ends. Through the lower boss 17 there extends a trunnion 18 that has its opposite end portions secured in bosses 19 (FIG. 5) on the frame, each such boss 19 being at the junction of a frame member 9 with a frame member 10. The trunnion 18 defines a pivot axis which is fixed in relation to the frame 4 and is parallel to the axis of the rear wheel, and the steering column support 11 is adjustingly swingable about that trunnion to carry its upper end forward and rearward relative to the frame.

The upper boss 16 on the steering column support comprises part of an adjusting connection between the frame and the steering column support 11 whereby swinging of the upper end of the latter relative to the frame is controlled. That connection further comprises an eccentric consisting of a shaft 20 which is carried by the frame and which has its axis parallel to that of the rear wheel 3, a block-like driver 21 carried by the shaft 20 to be confined thereby to swinging motion in opposite directions about the axis of the shaft 20, and a surface defining member 22 that is confined to rotation in the upper boss 16 about an axis which is vertically spaced from and parallel to the axis of the shaft 20. The surface defining member 22 is a cylindrical rotor through which there extends an axial passage 30 of substantially rectangular cross-section in which the block-like driver 21 is closely slidably confined. Cooperating slidingly engaged surfaces on the driver 21 and on the surface defining member 22, as described below, translate swinging motion of the driver 21 about the axis of the shaft 20 into backward and forward motion of the member 22 and thus of the upper boss 16 in which it rotates.

The block-like driver 21, which is elongated in the direction lengthwise of its shaft 20, can be made as an integral part of that shaft or can be formed separately from it, but in either case the driver must be confined to rotation about the axis of the shaft 20 and that shaft must, in turn, be confined against both axial and lateral motion relative to the frame 4. Thus each of the opposite end portions of the shaft 20 is received in a boss 23 or the like at the junction of frame members 8 and 10.

The driver 21 has a substantially rectangular cross-section which is uniform along its length, so that it has a pair of opposite flat and parallel wider side surfaces 25, 26 that are spaced equal distances to opposite sides of the axis of the shaft 20 and a pair of opposite flat and parallel narrower side surfaces 27, 28. The passage 30 through the cylindrical rotor 22 is likewise of a rectangular cross-section that is uniform along its length. That passage defines a pair of opposite flat and parallel wider side surfaces 31, 32 in the rotor 22 that are spaced equal distances to opposite sides of the axis of the rotor, and the distance between them is such that the wider side surfaces 25, 26 on the driver are respectively confined in sliding flatwise engagement with them. The narrower side surfaces 33, 34 in the rotor 22 are spaced apart by a substantially greater distance than the narrower side surfaces 27, 28 on the driver, to provide adequate clearance for sliding of the driver along the passage-defined surfaces 31, 32.

The cylindrical rotor 22, which can be considered a large diameter shaft, is confined to rotation in a closely fitting bore in the upper boss 16, preferably defined by a bushing 35 therein. As here shown the axis of the rotor 22 is spaced a short distance above the axis of the shaft 20, but it could as well be spaced below it.

Because the driver 21 has a close sliding fit in the passage 30 in the rotor 22, the driver and the rotor are constrained to rotate in unison; and owing to the vertically spaced relationship between the axes about which the driver and the rotor rotate, their unison rotation effects forward or rearward movement of the rotor relative to the frame 4, depending upon the direction of rotation. In turn such motion of the rotor effects swinging adjustment of the steering column support 11 about its pivot connection 18 to the frame.

Since the driver 21 and the rotor 22 rotate in unison about their respective axes, rotation can be imparted to either of them for adjusting the inclination of the steering axis $A_s$. As here shown a radially projecting arm 37 is secured to each end of the cylindrical rotor 22, as by means of a pair of screws 38 that are threaded into the rotor at opposite sides of its axis. Each arm 37 has a hole 39 through which the shaft 20 extends with substantial clearance. The two arms 37 project generally rearward, lengthwise parallel to one another, overlying opposite ends of the upper boss 16 and confined between that boss and the respective bosses 23 on the frame 4. Since the two arms 37 swing in unison, either or both of them can be connected with a jack-like actuator 40 which is also connected with the frame 4 to provide for adjustment of the inclination of the steering column axis $A_s$ when and as desired.

As shown rather diagrammatically in FIG. 7, the actuator 40 comprises a relatively elongated housing 42 alongside which there is mounted a small reversible electric motor 43. A lead screw 44 is confined to rotation in the housing and is driven for such rotation by the motor 43 through a gear 45 on the motor shaft that meshes with a gear 46 on a lower end of the lead screw. A tubular plunger 47 that is confined to lengthwise motion in the housing 42 has an internal thread that mates with the thread on the lead screw 44. At its lower end the housing 42 has a pivoted connection 50 to the frame 4, and at its upper end the plunger 47 has a pivoted connection 52 to one or both of the arms 37. It will be apparent that when the motor 43 is energized for rotation in one direction, the plunger 47 is axially extended upwardly out of the housing 42, while rotation of the motor in the opposite direction retracts the plunger; and it will also be apparent that the steering column 12 is adjustingly shifted to a more nearly vertical angle or to a more nearly horizontal angle in dependence upon the direction of rotation of the motor. Energization of the motor 43 can be controlled from a normally-off double-throw switch 55 mounted on the handlebars to be conveniently accessible for manual actuation by the cyclist and connected with the motor and with the battery or other electrical supply for the motorcycle in a circuit that will be obvious. It will be apparent that provision could readily be made for energization of the motor 43 in accordance with the outputs of a speed responsive sensor so that the angle of steering column inclination would be adjusted automatically in dependence upon speed of the motorcycle. Because the connection between the motor 43 and the rotor 22 comprises the lead screw 44, the steering column remains in any angular position to which it has been adjusted when the motor 43 is unenergized.

From the foregoing description taken with the accompanying drawings it will be apparent that this invention provides means whereby the angle of inclination of the steering column of a motorcycle can be quickly and easily adjusted to suit riding conditions, such adjustment being possible not only when the motorcycle is stopped but also when it is moving, and requiring no more than the actuation of a switch, which can be effected either manually or automatically.

What is claimed as the invention is:

1. A motorcycle having a frame, a rear wheel mounted on the frame for rotation on a rear wheel axis that has a fixed orientation relative to the frame, a tubular steering column support on the frame that has upper and lower ends and defines an upwardly and rearwardly inclined steering axis, a front wheel, and a steering column with which said front wheel has a connection and which extends coaxially through the steering column support and is confined to swiveling therein about the steering axis to provide for steering displacement of the front wheel relative to the frame, said motorcycle being characterized by:
    A. trunnion means connecting the frame and one end portion of said steering column support and defining a pivot axis which is parallel to said rear wheel axis and about which the other end portion of the steering column support is swingable forwardly and rearwardly relative to the frame;
    B. means providing an adjustable connection between the frame and said other end portion of the steering column support, comprising
        (1) a shaft carried by the frame and having a shaft axis which is in fixed relation to the frame and which is parallel to said pivot axis and vertically spaced a substantial distance therefrom,
        (2) a driver on said shaft having a portion which is eccentric to said shaft axis and which is confined by said shaft to swinging in opposite directions about the shaft axis to be carried thereby in opposite forward and rearward directions relative to the frame; and
        (3) surface defining means carried by said steering column support near said other end thereof and providing a pair of opposing surfaces between which said portion of the driver is slidingly confined and whereby components of motion of the driver in said forward and rearward directions are imparted to said other end of the steering column support while sliding of the driver along said surfaces accommodates vertical components of swinging motion of the driver;
    C. an actuating arm which extends substantially transversely to said shaft and has a connection with said driver whereby swinging of said arm constrains the driver to swing in unison therewith about said shaft axis; and
    D. actuating means reacting between said frame and said actuating arm for adjustingly swinging the latter and holding it in selected positions of its swinging motion.
2. The motorcycle of claim 1, further characterized by:
    (1) said driver having opposite substantially flat surfaces which are spaced equal distances to opposite sides of said shaft axis and which are flatwise slidingly engaged with said opposing surfaces on the surface defining means; and
    (2) said surface defining means comprising a cylindrical rotor having a passage therein which defines said pair of opposing surfaces; and
    (3) means on said steering column support, near said other end thereof, confining said rotor to rotation relative to the steering column support about a rotor axis which is spaced vertically from said shaft axis by a distance smaller than said substantial distance.
3. The motorcycle of claim 2 wherein said actuating arm is rigidly connected with said rotor to swing about said rotor axis and impart swinging motion to the driver through the rotor.
4. The motorcycle of claim 1 wherein said actuating means comprises a lead screw which is rotatable to effect adjusting swinging of said arm.

* * * * *